United States Patent [19]
Andtsjö et al.

[11] Patent Number: 6,084,041
[45] Date of Patent: *Jul. 4, 2000

[54] PROCESS FOR MAKING PROPYLENE HOMO OR COPOLYMERS

[75] Inventors: Henrik Andtsjö, Porvoo; Ismo Pentti, Kulloo; Ali Harlin, Vantaa, all of Finland

[73] Assignee: Borealis A/S, Lyngby, Denmark

[*] Notice: This patent issued on a continued prosecution application filed under 37 CFR 1.53(d), and is subject to the twenty year patent term provisions of 35 U.S.C. 154(a)(2).

[21] Appl. No.: 08/650,104

[22] Filed: May 17, 1996

[30] Foreign Application Priority Data

Oct. 10, 1995 [FI] Finland .................................. 954814

[51] Int. Cl.⁷ ..................................................... C08F 2/00
[52] U.S. Cl. .............................. 526/64; 526/65; 526/351; 526/901; 526/904; 526/905; 525/53; 525/240; 525/270; 525/322
[58] Field of Search .............................. 525/53, 240, 270, 525/322; 526/64, 65, 351, 901, 904, 905

[56] References Cited

U.S. PATENT DOCUMENTS

| | | |
|---|---|---|
| 3,294,772 | 12/1966 | Cottle . |
| 4,740,550 | 4/1988 | Foster ......................... 525/52 |
| 4,740,551 | 4/1988 | Foster ......................... 525/53 |
| 5,326,835 | 7/1994 | Ahvenainen et al. ..................... 526/64 |
| 5,391,654 | 2/1995 | Ahvenainen et al. ..................... 526/64 |

FOREIGN PATENT DOCUMENTS

| | | |
|---|---|---|
| 0 173220A2 | 8/1985 | European Pat. Off. . |
| 0 173220B1 | 6/1989 | European Pat. Off. . |
| 2129155 | 12/1971 | Germany . |
| 1340694 | 12/1973 | United Kingdom . |
| WO 8901002 | 2/1989 | WIPO . |
| WO 8901951 | 3/1989 | WIPO . |
| WO 8903847 | 5/1989 | WIPO . |
| WO 9212182 | 7/1992 | WIPO . |
| WO 9305082 | 3/1993 | WIPO . |

OTHER PUBLICATIONS

Spitz et al., *Makromol. Chem.*, 190(1989) 707–716.
Sergeev et al., *Makromol Chem.*, 190(1984) 2377–2385.

*Primary Examiner*—David W. Wu
*Assistant Examiner*—Ling-Siu Choi
*Attorney, Agent, or Firm*—Birch, Stewart, Kolasch & Birch, LLP

[57] ABSTRACT

A process for homo or copolymerizing propylene, wherein propylene is polymerized in the presence of a catalyst at an elevated temperature in a reaction medium in which a major part of the reaction medium is propylene and the polymerization is carried in at least one CSTR or loop reactor, where the polymerization is carried out at a temperature and a pressure which are above the corresponding critical temperature and the pressure of the reaction medium and where the residence time is at least 15 minutes. The process can also comprise a supercritical loop polymerization before the supercritical stage polymerization or a gas phase polymerization after the supercritical stage polymerization.

23 Claims, No Drawings

PROCESS FOR MAKING PROPYLENE HOMO OR COPOLYMERS

FIELD OF THE INVENTION

The invention is related in process for making propylene polymers or copolymers in propylene medium.

BACKGROUND OF THE INVENTION

The loop reactor bulk polymerization process for making propylene polymers is a well-known process, in which polymerization takes place in loop reactors with the polymer forming as solid particles suspended in a liquid comprising mainly propylene monomer. The reactor content is maintained in a highly agitated state by circulating the reaction mixture containing reactants and polymer at comparatively high velocity around the reactor loop by means of a circulation pump. The heat of polymerization is removed by a water cooling jacket enclosing each reactor leg. The polymer is removed from the reactor by opening and closing continuously or periodically a discharge valve to release both liquid and solid reaction mixture.

There are at least three major problems in the conventional loop reactor polymerization. The reactor temperature and pressure must be such that the entire reactor is completely filled with a reaction mixture containing reactants and polymer and no vapor bubbles will cause cavitation in the circulation pump. The reactor diluent must be selected to provide the minimum polymer solubility to prevent reduction of heat removal by fouling, especially with copolymers. The reactor diluent must be volatile to minimize the requirement for heat addition in order to separate diluent from the finished polymer powder.

In ethylene polymerization these problems can be avoided if supercritical conditions are used. The normally used diluent, isobutane, is replaced by propane and no bubble formation and cavitation in the loop reactor takes place, when the operating temperature and pressure are in the supercritical region. Further, the polymer is less soluble in supercritical propane and the flashing of monomer is easier, because the fluid contains more heat from the polymerization reactor. (see WO 92/12181). However, in ethylene polymerization with a slurry process the monomer concentration in the reaction medium is usually rather low (e.g. 5–15 wt. %).

Another known process for manufacturing propylene polymers is the gas phase process, where the propylene monomer is polymerized in a fluidized bed of forming polymer particles. The polymerization bed is cooled by circulating gaseous mixture of propylene and optional comonomers and hydrogen from the top of the reactor via cooler and returning it back to the bottom of the reactor. Make-up propylene is added to the circulation.

Known are also multistage processes for manufacturing polypropylene, where more than one reactor are used in series.

All known processes have some limitations. Therefore a need exists for a flexible process, where it is possible to produce various kinds of propylene polymers having a molecular weight range from high to low and molecular weight distribution from narrow to broad.

Propylene has a critical temperature, which is even lower than propane (91.4° C./96.8° C.). The polymerization of propylene under supercritical conditions is not novel. In U.S. Pat. No. 4,740,550 there is disclosed a multistage copolymerization process for making propylene-ethylene copolymers. In this process propylene is homopolymerized in one or more pipe-loop reactors, in the presence of magnesium and titanium containing catalyst, resulting in a homopolymer reaction suspension, transferring said homopolymer reaction suspension to a separator and separating a stream of reduced-fine homopolymer particles, transferring said stream of reduced-fine homopolymer particles to a gas-phase a fluidized bed homopolymer reactor and homopolymerizing additional propylene, removing a stream of propylene homopolymer particles and transferring it to a gas-phase fluidized bed copolymer reactor, and copolymerizing ethylene and propylene resulting in a propylene-ethylene impact copolymer.

In said patent, the homopolymerization of propylene under supercritical state in the pipe-loop reactor is mentioned as one alternative. The patent is theoretical and contains no real examples. The only calculated examples refer to the polymerization under supercritical conditions. A six-inch diameter pipe-loop reactor having a considerable length of about 400 m is described. The reactor has a total volume of 6.78 $m^3$, which is a typical size of a prepolymerization reactor, and small when compared to ordinary loop reactors (35 $m^3$). In such a reactor the residence time is only, 10 minutes. Otherwise, it would be impossible to circulate the polymer reaction medium in the pipe reactor. Moreover, the process described in the patent is rather complex, comprising three reactors and is intended to produce propylene-ethylene impact copolymers.

SUMMARY OF THE INVENTION

The present invention concerns a multistage process for homo or copolymerizing propylene, wherein propylene is polymerized in the presence of a catalyst at an elevated temperature in a reaction medium, in which a major part is propylene. This invention does not concern so called solution polymerization where polymer is dissolved in the reaction medium, but rather bulk polymerization where polymerization takes place essentially among the monomer reactants and catalysts. According to the invention, the polymerization is carried in at least one continuous stirred-type reactor (CSTR) or loop reactor, where the polymerization is carried out at a temperature and a pressure above the corresponding critical temperature and pressure of the reaction medium and where the residence time is at least 15 minutes.

The term "supercritical" condition or state in the specification means that both the temperature and the pressure in the reactor are above the corresponding supercritical temperature and the pressure of the reaction medium.

In super critical operation mode with appropriate catalyst one can achieve higher conversions, e.g. 57% instead of conversion of 50% in a normal 70° C. loop. This has great impact on the savings of the catalyst and possibility to have less unconverted monomer to the recovery section. The same can put also in the terms of higher reactor productivity allowing a smaller reactor volume to be used and thereafter lower investment costs. However, that advantage is reduced by higher investment costs of higher pressure reactors.

The reactor concept, in which at least one reactor is a CSTR reactor or loop reactor and operates under supercritical conditions is new and gives possibility to a more flexible production of different polypropylene grades. In the reactor it can be produced a very high molecular weight polymer up to 2,000,000 or more by adding no hydrogen or a minor amount of hydrogen. Because the temperature is high, the molecular weight distribution will be narrow. On the other hand, hydrogen can be added in very great amounts to the reactor without risk to cause cavitation in the blades of the reactor pump circulating the reaction mixture. Thereby manufacturing polymers of low molecular weight or high melt index comes possible. Similarly comonomers, such as ethylene can be added into the reactor in any desired amount.

According to one preferable embodiment of the invention, the process comprises two loop reactors connected in series, whereby both reactors are operated at the supercritical pressure and the first reactor is operated either below or above the critical temperature of the reaction medium and the second reactor is operated above the supercritical temperature. If in the first loop reactor a lower temperature is used and no or a minor amount of hydrogen is fed to the reactor, a very high molecular weight polymer having a relatively broad molecular weight distribution is produced. If a higher temperature is used, the molecular weight distribution will be narrower. The second reactor operates above the supercritical temperature of the reaction medium and hydrogen is added in greater amounts, which gives a final polymer having a bimodal molecular weight distribution.

According to the still another embodiment of the invention, the first reactor is a loop reactor, which operates under supercritical conditions, and the second reactor is a gas phase reactor. In such a case, the polymerization medium can be either separated from the product flow before continuation of the polymerization in gas phase reactor, or the polymerization medium including the polymer can be fed to the gas phase reactor without separating the polymerization medium.

According to a further embodiment of the invention, the critical temperature of the reaction mixture is lowered by adding inert components, which have low critical temperature. Thus, it is possible to operate at lower temperatures, but still achieve the advantages of the supercritical state.

DETAILED DESCRIPTION OF THE PREFERRED EMBODIMENTS

According to the first embodiment of the invention, the process comprises only one CSTR reactor or loop reactor, which is operated under supercritical conditions. This means that the temperature must be higher than the corresponding critical temperature and the pressure higher than the corresponding critical pressure of the reaction medium, which conditions for propylene are 92° C. and 46 bar. The ultimate upper limit of the temperature is the melting point of the resulting polymer, but unnecessarily high temperatures cause an increase in the solubility of the polymer. Preferable temperatures are therefore in the range of 92–110° C. The pressure has no upper limit, but for practical reasons the preferable pressures are in the range of 46–100 bar, preferably 50–70 bar.

In some cases it is desirable to decrease the critical temperature of the reaction medium. For example, in manufacturing propylene copolymers the solubility of the copolymer in the reaction medium at 92° C. may be unnecessarily high. Some catalysts may not work properly at the temperatures above 90° C. In such cases it is possible to add to the reaction medium components which decrease the critical temperature of the reaction medium. Examples of such components are methane and ethane. The supercritical temperature and pressure of methane are −82.1° C. and 45.8 bar. The corresponding values for ethane are 32.3° C. and 48.2 bar. Thus these components can be added to the reaction mixture in amounts of up to 20% and thereby achieve critical temperatures of the reaction medium well below 90° C.

The polymerization is carried out by feeding a catalyst system, a mixture of propylene acting as reaction diluent and optional hydrogen and comonomer into the reactor and circulating the mixture with a pump. The polymerization heat is removed by cooling the reactor by cooling jacket. The residence time in the loop reactor must be at least 15 minutes, preferably 20–60 minutes for obtaining a sufficient degree of polymerization. This is necessary to achieve polymer yields of at least 25 kg PP/g cat and to produce a major part of the product in the reactor.

If the product desired is polypropylene having very high molecular weight, no hydrogen or a minor amount of hydrogen is fed into the reactor. In such a way molecular weights of up to 2,000,000 or more can be achieved. Because the temperature is high, the molecular weight distribution of the polymer tends to be narrow.

If lower molecular weight polypropylene is the desired product hydrogen can be fed into the reactor. Because the reaction mixture is in supercritical state, there is no limitation in the amount of hydrogen added. Thereby great amounts of hydrogen can be added to the reaction mixture without risk of gas bubbles inside the reactor, which could cause cavitation in the blades of the circulation pump. Very high melt indices can be achieved. The solubility of the polymer into the supercritical reaction medium is less than in lower supercritical temperatures.

The process described above makes it possible to produce polypropylenes having a molecular weight and melt index varying from low to very high, and a high isotacticity index. The products have high elasticity or high crystallinity and high flexural modulus.

As a catalyst can be used all stereo specific catalysts for propylene polymerization such catalysts include Ziegler-Natta catalysts for propylene polymerization. A typical procatalyst compositions comprise a titanium halogenide compound on a magnesium chloride carrier. A typical cocatalyst is $C_1$–$C_{10}$ alkyl aluminum compound. The catalyst system can additionally include compounds, which improve or modify catalytic properties, such as electron donor compounds. The electron donors control the stereospecific properties and/or improve the activity of catalyst system. The art knows a great number of electron donors including ethers, esters, polysilanes, polysiloxanes, and alkoxysilanes.

Examples of the catalyst systems, which are usable according to the invention, are catalysts disclosed for example in U.S. Pat. No. 5,234,879, EPO 627449 and EPO 586390.

It is preferable to use such catalysts which can withstand the high temperatures prevailing in the supercritical loop reactor. The conventional Ziegler-Natta catalysts for isotactic polymerization of propylene generally have an operating temperature limit of around 80° C., above which they either become deactivated or lose their stereoselectivity. This low polymerization temperature may put a practical limit on the heat removal efficiency of loop reactor.

One preferable catalyst to be used according to the invention is disclosed in EPO 591224. In the application there is disclosed a method for preparing a procatalyst composition from magnesium dichloride, titanium compound, a lower alcohol and an ester of phthalic acid containing at least five carbon atoms. According to the patent, a transesterification reaction is carried out at an elevated temperature between lower alcohol and phthalic acid, whereby the ester groups from lower alcohol and phthalic acid change their place.

$MgCl_2$ can be used as such or it can be combined with silica, e.g. by absorbing the silica with a solution or slurry containing $MgCl_2$. The lower alcohol used can be preferably methanol or ethanol, particularly ethanol.

The titanium compound used in the preparation of the procatalyst is preferably an organic or inorganic titanium compound, which is at the oxidation state of 3 or 4. Also other transition metal compounds, such as vanadium, zirconium, chromium, molybdenum and tungsten compounds can be mixed with the titanium compound. The titanium compound usually is halide or oxyhalide, an organic metal halide, or a purely metal organic compound in which only organic ligands have been attached to the transition metal. Particularly preferable are the titanium halides, especially $TiCl_4$.

The alkoxy group of the phthalic acid ester used comprises at least five carbon atoms, preferably at least eight carbon atoms. Thus, as the ester can be used for example propylhexyl phthalate, dioctyl phthalate, di-isodecyl phthalate and ditridecyl phthalate. The molar ratio of phthalic acid ester and magnesium halide is preferably about 0.2.

The transesterification can be carried out, e.g. by selecting a phthalic acid ester—a lower alcohol pair, which spontaneously or by the aid of a catalyst, which does not damage the procatalyst composition, transesterifies the catalyst at an elevated temperature. It is preferable to carry out the transesterification at a temperature, which is between 110–150° C., preferably between 130–140° C.

The catalyst prepared by the method above is used together with an organometallic cocatalyst, like aluminum trialkyl, and preferably with an external donor, such like cyclohexyl methylmethoxy silane (CHMMS) or dicylopentyl dimethoxy silane (DCPDMS).

According to the invention, such catalysts are typically introduced into the first reactor only. The components of the catalyst can be fed into the reactor separately or simultaneously or the components of the catalyst system can be precontacted prior the reactor.

Such precontacting can also include a catalyst prepolymerization prior to feeding into polymerization reactor. In the prepolymerization, the catalyst components are contacted for a short period with a monomer before feeding to the reactor.

As catalyst also metallocene-type catalysts can be used. These catalysts have been suggested to be used as a homogenous system or deposited onto carrier, for example inorganic oxide carriers. Thus these catalysts typically comprise as a procatalyst component a metallocene compound, for example bis(cyclopentadienyl)titanium dialkyl or bis(cyclopentadienyl)zirconium alkonyl or chlorides thereof, and an activator component, which typically is alumoxane or an ionic activator. One example of such a catalyst is disclosed in WO 94/14856.

Hydrogen can be added in the reactor 0.001–100 mol-$H_2$/kmol propylene, preferably in the range of 1,5–15 mol $H_2$/kmol propylene. The supercritical conditions allow the high amounts of hydrogen added into the reactor.

Comonomers can be added into the reactor in any desired amount, preferably 0–20% of the monomer feed. Ethylene, butylene and hexene, among others, can be used as comonomers for the manufacture of polymers for blow molding sheets, pipe and film.

According to a preferable embodiment of the invention it comprises two loop reactors, whereby the first reactor is operated at a supercritical temperature and at the same pressure as the second reactor. In the first reactor the temperature can be in the range of 50–80° C. and the pressure in the range of 50–70 bar. Hydrogen can be present in the amount of 0–15 mol/kmol propylene feed, preferably 0–3 mol/kmol propylene. Because the polymerization temperature is low, the molecular weight distribution tend to be broad.

The second reactor is operated under supercritical conditions, in which the temperature and the pressure conditions as described above. The residence time in this reactor must be at least 15 minutes, preferably 20–60 minutes.

Hydrogen can be added in the second reactor 0.001–100 mol $H_2$/kmol propylene, preferably in the range of 1,5–15 mol $H_2$/kmol propylene. The amount of hydrogen into the second reactor is in every case higher than into the first reactor. The supercritical conditions allow the high amounts of hydrogen added into the second reactor.

Comonomers can be added into the first reactor in any desired amount, preferably 0–20% of the monomer feed. Ethylene, butylene and hexene, among others, can be used as comonomers for the manufacture of polymers for blow molding sheets, pipe and film.

By this way homopolymers having a broad or bimodal molecular weight distribution can be produced. The polymers have a high flexural modulus of 1700–2100 MPa.

According to another embodiment of the invention, the first reactor is a loop reactor operating under supercritical conditions and a second reactor system having one or more gas phase reactors, preferably one gas phase reactor. The polymerization in the gas phase can be carried out at a temperature of 60–100° C. and in the pressure of 10–40 bar. It is desirable that no hydrogen or a minor amount of hydrogen is fed into the gas phase reactor. Therefore hydrogen is preferably removed from the reaction mixture before feeding the polymer into the gas phase reactor. This can be done by ordinary means, for example by cyclone separators or low pressure flashing.

The invention is further illustrated by the following non-limiting examples.

EXAMPLE 1

Propylene was polymerized in stirred tank reactor having a volume of 5 l. 476,7 mg triethyl aluminum as a cocatalyst, 39,3 mg of cyclohexyl methyldimethoxy silane as an external donor and 30 ml of n-heptane were mixed and allowed to react 5 minutes. Half of the mixture was added to the polymerization reactor and the other half was mixed with 20 mg of a catalyst component prepared according to EPO 591224. After an additional 5 minutes the catalyst/TEA/donor/n-heptane mixture was added to the reactor. Al/Ti mole ratio was 500 and Al/external donor was 20 mol/mol. 70 mmol hydrogen and 1400 g of propylene were introduced into the reactor and the temperature was raised within about 30 minutes to 93° C. and the pressure 48 bar while mixing. The polymerization time was 60 minutes, after which the polymer formed was taken out from the reactor.

The polymer had the following characteristics:

| | |
|---|---|
| Activity (kgPP/g cat*h) | 41.3 |
| $MFR_2$ (g/10 min.) | 23.8 |
| Flexural modulus (MPa) | 1720 |

EXAMPLE 2

Comparison

Example 1 was repeated, but the polymerization temperature was 70° C. The time to reach 70° C. was 15,5 minutes. Otherwise, the conditions were the same.

| | |
|---|---|
| Activity (kgPP/g cat*h) | 32.2 |
| MFR$_2$ (g/10 min) | 5.6 |
| Isotacticity index (%) | 98.0 |
| Polydispersity | 4.8 |
| Flexural modulus (MPa) | 1650 |

EXAMPLE 3

According to Example 1, except that no hydrogen was used and DCPDMS was used as donor.

The polymer had the following characteristics:

| | |
|---|---|
| Activity (kgPP/gcath) | 21.1 |
| MFR$_2$ (g/10 min) | <0.05 |
| Isotacticity index (%) | 99.6 |
| Molecular weight (M$_w$ *10$^3$) | >2000 |
| Polydispersity | n.d |
| Elasticity at G" = 2000Pa | n.d |
| G" = 5000Pa | n.d |
| Melting point (° C.) | 166.1 |
| T$_{cryst}$ (° C.) | 114.2 |
| Crystallinity (%) | 45.6 |
| Flexural modulus (MPa) | n.d. |

EXAMPLE 4

Propylene was polymerized in two stages in stirred-tank reactor having a volume of 5 l. The catalyst was prepared like in Example 1, except DCPDMS was used as an electron donor. 20 mg of this catalyst mixture was loaded into the reactor. Propylene was introduced into the reactor and the temperature was raised in 28 minutes to 93° C. and the pressure of 46 bar while mixing. The polymerization time was 30 minutes, after which 4.6 bar hydrogen/1000 ml vessel was added and the polymerization was continued for another 30 minutes. Thereafter the polymer formed was taken out from the reactor.

The polymer had the following characteristics:

| | |
|---|---|
| Activity (kgPP/gcath) | 44.8 |
| MFR$_2$ (g/10 min) | 1.4 |
| Isotacticity index (%) | 99.4 |
| Molecular weight (M$_w$ *10$^3$) | 410 |
| Polydispersity | 14.4 |
| Elasticity at G" = 2000Pa | 1070 |
| G" = 5000Pa | 3540 |
| Melting point (° C.) | 165.2 |
| T$_{cryst}$ (° C.) | 114.3 |
| Crystallinity (%) | 48.9 |
| Flexural modulus (MPa) | 1770 |

EXAMPLE 5

According to Example 4, propylene was polymerized in two stages, except that ethylene 3.65 w-% of propylene was added into the first stage and 5.0 bar/1000 ml was added into the second stage.

The polymer had the following characteristics:

| | |
|---|---|
| Activity (kgPP/gcath) | 39.1 |
| MFR$_2$ (g/10 min) | 0.3 |
| Isotacticity index (%) | |
| Molecular weight (M$_w$ *10$^3$) | 890 |
| Polydispersity | 13.7 |
| Elasticity at G" = 2000Pa | 910 |
| G" = 5000Pa | 3010 |
| Melting point (° C.) | 151.3 |
| T$_{cryst}$ (° C.) | 101.4 |
| Crystallinity (%) | 34.4 |
| Ethylene content (%) | 2.0 |
| Flexural modulus (MPa) | 814 |

EXAMPLES 6–7

Propylene was polymerized in a loop reactor having a volume of 100 l. As catalyst it was used a catalyst system comprising a procatalyst made according to EPO 591224, triethyl aluminum as a cocatalyst and cyclohexyl methylmethoxy silane as an outer donor. The catalyst was prepolymerized in a mixture of polyethylene wax and polyalfa-olefin oil with propylene to obtain a prepolymerization degree of 5 parts polypropylene per 1 part of the catalyst. The Al/Ti ratio was 100 and Al/D ratio (CHMMS was used) was 10. The polymerization was carried out by feeding into the reactor 20 kg/h of propylene, 0,6 g/h of the catalyst above and hydrogen for MFR control so that its concentration in the reactor was 2400 ppm (Example 6) and 8700 ppm (Example 7). The reactor temperature was 93° C. and the pressure was 53 bar. The production rate was 5.7–5.8 kg/h. The polymers had the following properties.

| | Example 6 | Example 7 |
|---|---|---|
| MFR$_2$ (g/10 min) | 8,1 | 52 |
| Isotacticity index (%) | 97.2 | 96.2 |
| Bulk density (kg/dm$^3$) | 0,44 | 0,44 |
| Elasticity at G" = 2000Pa | 550 | 470 |
| G" = 5000Pa | 1940 | 1830 |
| Melting point (° C.) | | |
| Flexural modulus (MPa) | 1590 | 1730 |

EXAMPLES 8–10

According to Example 6–7 in a loop reactor having a volume of 150 l, except that the Al/Ti ratio was 75, Al/D ratio was 5, donor was DCPDMS, and MFR was controlled with different hydrogen concentrations.

| | Example 8 | Example 9 | Example 10 |
|---|---|---|---|
| MFR$_2$ (g/10 min) | 6.5 | 22.8 | 60.9 |
| Isotacticity index (%) | 98.0 | 99.6 | 99.4 |
| T$_{cn}$ ° C. | 118.6 | 119 | 115 |
| T$_{ml}$ ° C. | 164 | 164.6 | 163 |
| Crystallinity, % | 53 | 54.6 | 52.6 |
| Zero viscosity, Pas | 5320 | 1370 | 520 |
| Polydispersity index P1 | 3.8 | 3.8 | 3.6 |
| Elasticity index (G"2000)Pa | 530 | 520 | 510 |
| Tensile strength, Mpa | 36.4 | 37.0 | 37.5 |
| Elongation at yield, % | 9.0 | 8.4 | 7.3 |
| Tensile Modulus, Mpa | 1660 | 1700 | 1700 |
| Flexural modulus, MPa | 1630 | 1700 | 1730 |
| Izod notched, RT, kJ/m$_2$ | 5.25 | 3.7 | 3.29 |
| Izod notched, −30° C., kJ/m$^2$ | | | |

EXAMPLES 11–12

According to Example 9, except that the product of the first polymerization in the loop was transferred in a fluidized bed reactor equipped with a mechanical stirrer. Pressure in the gas phase was 10 bar and the polymerization temperature was 70° C. The gas ratio $[C_2]/([C_2^-]+[C_3^-])$ was 0.30.

|  | Example 11 | Example 12 |
|---|---|---|
| Loop reactor: |  |  |
| MFR$_2$ (g/10 min) | 16.3 | 19.0 |
| Total solubles, % | 1.5 | 1.5 |
| Final product: |  |  |
| MFR$_2$ (g/10 min) | 13.8 | 8.0 |
| Ethylene content | 3.4 | 5.8 |
| Xylene solubles, % | 10.6 | 18.8 |
| Ethylene in rubber, % | 25.5 | 23.9 |
| Rubber instrict viscosity | 2.71 | 3.2 |
| Falling weight impact RT | 29.4 |  |
| 0° C. | 20.3 | 46.5 |
| −20° C. |  | 49.2 |
| Tensile Modulus, Mpa | 1290 | 990 |
| Flexural modulus, MPa | 1310 | 1060 |
| Izod notched, RT, kJ/m$_2$ | 7.9 | 18.3 |
| Izod notched, 0° C., kJ/m$^2$ | 5.7 | 10.3 |
| Izod notched, −30° C., kJ/m$^2$ | 4.8 | 6.7 |

EXAMPLE 13

According to Example 9, except that 0.83 w-% ethylene was fed in the loop reactor.

| MFR$_2$ (g/10 min) | 2.1 |
|---|---|
| Ethylene content | 1.07 |
| Tensile Modulus, Mpa | 1290 |
| Flexural modulus, MPa | 1310 |
| Izod notched, RT, kJ/m$_2$ | 7.9 |
| Izod notched, 0° C., kJ/m$^2$ | 5.7 |
| Izod notched, −30° C., kJ/m$^2$ | 4.8 |

EXAMPLE 14

According to Example 9, except that prepolymerization was made by contacting the catalyst with triethylaluminium (TEA) and cyclohexyl methylmethoxy silane (CHMMS) (Al/Ti ratio was 3 and Al/donor ratio was 3 (mol). The mixture was flushed with propylene (15 kg/h) to a continuous prepolymerization reactor, which was operated at a pressure of 40 bar and at a temperature of 20° C., the mean residence time being about 10 min.

| MFR$_2$ (g/10 min) | 16.2 |
|---|---|
| Tensile Modulus, Mpa | 1570 |
| Flexural modulus, MPa | 1600 |
| Izod notched, RT, kJ/m$_2$ | 4.2 |

EXAMPLE 15

According to Example 14, except that the residence time in loop reactor was reduced by increased propylene feed in the reactor. The production rate of the loop reactor was 5.5 kg/h (Example 15) and 8 kg/h (Example 14) when 25 minutes instead of the original value of 1 h respectively.

EXAMPLE 16

Comparison

According to Example 6, except that the polymerization temperature is 70° C.

| MFR$_2$ (g/10 min.) | 10 |
|---|---|
| Isotacticity index | 95.5 |
| Flexural Modulus, Mpa | 1490 |

EXAMPLE 17

Product of Example 9 nucleated with 0.1 w-% of Na Benzoate.

| MFR$_2$ (g/10 min) | 20.6 |
|---|---|
| Crystallinity, % | 55 |
| Tensile Strength, Mpa | 38.6 |
| Tensile Modulus, Mpa | 1880 |
| Flexural modulus, MPa | 1930 |
| Izod notched, RT, kJ/m$_2$ | 4.09 |

EXAMPLES 18–20

Simulations of double loop PP process has been made. Design basis were two loops, overall heat transfer coefficient 1200 W/(m$^{2°}$ C.), feed temperature 25° C., total loop volume 79 m$^3$, both loops of equal size. The minimum cooling water inlet temperature to cooling jacket has been set to 37° C. This jacket water is cooled by water with inlet temperature 27° C. Fluid density is based on corresponding physical properties of propylene at 65 bar. Catalyst kinetics was based on laboratory test polymerizations. The high overall heat transfer coefficient values are observed in operating supercritical loop reactor.

Cooling capacity is not limiting in the cases below and are therefore left out of discussion.

Variable was temperature 70° C. (reference) and 94° C.

|  | (ref.) |  |  |
|---|---|---|---|
|  | 18 | 19 | 20 |
| Polym. temp., ° C. | 70 | 94 | 94 |
| Total prod. rate t/h | 18.75 | 18.75 | 22.2 |
| Catlyst feed, kg/h | 0.623 | 0.415 | 0.555 |
| Productivity, kgPP/kgcat | 30126 | 45187 | 39910 |

In Example 19 is demonstrated catalyst savings of 25% compared to reference Example 18. Further, in Example 20 is shown production rate increased by 18% compared to Example 21.

EXAMPLES 21–24

Metallocene catalysts were polymerized in laboratory in supercritical conditions. Two different catalysts were produced with impregnation on the silica namely MPP-1 with 1,2-ethylene-bis(indenyl)zirconium dichloride, and MPP-2 with dimethysilyl-bis(indenyl)zirconium dichloride. In the catalysts there were 0,2 wt % Zr, 11 wt % Al, and Al/Zr was 200.

The polymerization Examples 21–23 were made according to Example 1, except no hydrogen, cocatalyst, and donor was fed into the reactor.

|  | 21 | 22 | 23 | 24 |
| --- | --- | --- | --- | --- |
| Catalyst | MPP-1 | MPP-1 | MPP-2 | MPP-2 |
| Polym. temp., °C. | 50 | 94 | 50 | 94 |
| Activity, gPP/gcat | 130 | 250 | 220 | 510 |

EXAMPLE 25

The polymerization was carried out in a stirred autoclave. In the autoclave was added 25 bar methane, 0.5 bar hydrogen, and 500 ml propylene. Catalyst like MPP-2 with 0.15 wt % of Zr and Al/Zr of 280 was used. Totally 350 mg cat was fed into the reactor. Polymerization temperature was 70° C., and 54 bar which are above the corresponding critical values of the reaction medium. As a result was 180 g of fine well flowing powder.

We claim:

1. A bulk polymerization process for homo- or copolymerizing propylene comprising:

polymerizing propylene in the presence of a catalyst in at least one continuous stirred reactor or loop reactor at a temperature and a pressure above the corresponding critical temperature and pressure of the reaction medium for at least 15 minutes to form the propylene polymer or copolymer particles, wherein the catalyst comprises magnesium dichloride, a titanium compound, and a transesterification reaction product of an alcohol and an ester of phthalic acid.

2. The bulk polymerization process according to claim 1, wherein said polymerizing is carried out at a temperature above 92° C. and at a pressure above 46 bar.

3. The bulk polymerization according to claim 1 or 2, wherein the reaction medium contains 0.001–100 mol hydrogen/kmol of propylene.

4. The bulk polymerization according to claim 1, comprising carrying out polymerizing in two loop reactors, wherein a first polymerizing step is carried out at a supercritical temperature in a first loop reactor; and a second polymerizing step is carried out under supercritical temperature and pressure in a second loop reactor.

5. The bulk polymerization process according to claim 4, wherein the polymerizing temperature in the first loop reactor is 50–80° C. and the polymerizing temperature and pressure in the second loop reactor are 92–110° C. and 46–80 bar.

6. The bulk polymerization process according to claim 4, comprising feeding hydrogen at a concentration of 0–15 mol/kmol of propylene into the first loop reactor, and feeding hydrogen at a concentration of 0.001–100 mol/kmol of propylene into the second loop reactor.

7. The bulk polymerization process according to claim 4, comprising adding hydrogen only to the second loop reactor.

8. The bulk polymerization process according to claim 1 or 2, comprising carrying out two polymerizing steps at a temperature above 92° C. and at a pressure above 46 bar.

9. The bulk polymerization process according to claim 2, comprising conducting said polymerizing step in a loop reactor; feeding the resulting polymer or copolymer into a gas phase reactor; and conducting a second polymerizing step in said gas phase reactor.

10. The bulk polymerization process according to claim 9, wherein the temperature and pressure in the gas phase reactor are 60–100° C. and 10–40 bar.

11. The bulk polymerization process according to claim 1, wherein the lower alcohol is methanol or ethanol, the ester of phthalic acid is dioctylphthalate, and transesterification is carried out at a temperature of 110–150° C.

12. The bulk polymerization process according to claim 11, wherein the components of the catalyst are precontacted before feeding into said reaction medium.

13. The bulk polymerization process according to claim 1, wherein the catalyst is prepolymerized with propylene at a temperature of 20–80° C. before feeding into the reactor.

14. The bulk polymerization process according to claim 1, wherein comonomers other than propylene are added to the reaction medium.

15. The bulk polymerization process according to claim 14, wherein said comonomers are ethylene or butylene.

16. The bulk polymerization process according to claim 1, comprising adding up to 20% of methane or ethane to said reaction mixture.

17. A bulk polymerization process for homo- or copolymerizing propylene comprising:

polymerizing propylene in the presence of a catalyst in at least one continuous stirred reactor or loop reactor at a temperature and pressure above the corresponding critical temperature and pressure of the reaction medium for at least 15 minutes to form the propylene polymer or copolymer particles, wherein said catalyst is a metallocene catalyst.

18. The bulk polymerization process according to claim 6, comprising feeding hydrogen into the first loop reactor at a concentration of 0–3 mol/kmol of propylene.

19. The bulk polymerization process according to claim 6, comprising feeding hydrogen into the second loop reactor at a concentration of 1.5–15 mol $H_2$/per kmol of propylene.

20. The bulk polymerization process according to claim 5, comprising feeding hydrogen only into the loop reactor operating under supercritical conditions.

21. The bulk polymerization process according to claim 5, comprising feeding hydrogen at a concentration of 0–15 mol/kmol of propylene into the first loop reactor, and feeding hydrogen at a concentration of 0.001–100 mol/kmol of propylene into the second loop reactor.

22. The bulk polymerization according to claim 2, comprising carrying out polymerizing in two loop reactors, wherein a first polymerizing step is carried out at a supercritical temperature in a first loop reactor; and a second polymerizing step is carried out under a temperature above 92° C. and at a pressure above 46 bar.

23. The bulk polymerization process according to claim 1, wherein said polymerizing step is carried out for 20 to 60 minutes.

* * * * *